US012721704B1

(12) United States Patent
Wu et al.

(10) Patent No.: US 12,721,704 B1
(45) Date of Patent: Sep. 1, 2026

(54) METHOD AND SYSTEM FOR DIGITAL FABRICATION OF DENTURE

(71) Applicant: SHENZHEN UP3D TECH CO., LTD., Shenzhen (CN)

(72) Inventors: Gang Wu, Shenzhen (CN); Dongbin Huang, Shenzhen (CN); Lirong Mao, Shenzhen (CN); Dongling Chen, Shenzhen (CN)

(73) Assignee: SHENZHEN UP3D TECH CO., LTD., Shenzhen (CN)

( * ) Notice: Subject to any disclaimer, the term of this patent is extended or adjusted under 35 U.S.C. 154(b) by 0 days.

(21) Appl. No.: 19/454,662

(22) Filed: Jan. 21, 2026

(30) Foreign Application Priority Data

Dec. 26, 2025 (CN) ......................... 202512007031.0

(51) Int. Cl.
*A61C 13/00* (2006.01)
*A61C 13/10* (2006.01)
*A61C 13/20* (2006.01)
*A61C 13/34* (2006.01)

(52) U.S. Cl.
CPC ...... *A61C 13/0004* (2013.01); *A61C 13/0028* (2013.01); *A61C 13/1003* (2013.01); *A61C 13/206* (2013.01); *A61C 13/34* (2013.01)

(58) Field of Classification Search
None
See application file for complete search history.

(56) References Cited

U.S. PATENT DOCUMENTS

2014/0372085 A1* 12/2014 Korten ............... A61C 13/0004 703/1

* cited by examiner

*Primary Examiner* — Sean Shechtman
(74) *Attorney, Agent, or Firm* — JEEN IP LAW, LLC

(57) ABSTRACT

The disclosure relates to the technical field of prosthodontics, and in particular, to a method and system for digital fabrication of a denture. The method includes: editing attributes of a three-dimensional model of a prefabricated tooth, and establishing a template database; obtaining oral data of a patient, and performing tooth arrangement design and base design; determining, based on a virtual denture model, a three-dimensional model of a positioning auxiliary body; fabricating a positioning auxiliary body according to the three-dimensional model of the positioning auxiliary body; and using the positioning auxiliary body to physically position and arrange the physical prefabricated tooth corresponding to the three-dimensional model of the prefabricated tooth, and bonding the physical prefabricated tooth to a gingival base material, to form the denture. In the disclosure, the physical prefabricated tooth is integrated into a digital workflow, solving the difficulty in efficiently utilizing the prefabricated tooth in a digital solution.

20 Claims, 18 Drawing Sheets

METHOD AND SYSTEM FOR DIGITAL FABRICATION OF DENTURE

CROSS-REFERENCE TO RELATED APPLICATIONS

This application claims priority to Chinese Patent Application No. 202512007031.0, filed on Dec. 26, 2025, which is hereby incorporated by reference in its entirety.

TECHNICAL FIELD

The present disclosure relates to the technical field of prosthodontics, and in particular, to a method and system for digital fabrication of a denture.

BACKGROUND OF THE INVENTION

Dentures, a common restoration method for patients with a dentition defect, aim at restoring the chewing function, pronunciation, and facial aesthetics of patients.

The traditional denture fabrication depends on the manual operation of those of ordinary skill in the art to a great extent. For example, during the tooth arrangement, those of ordinary skill in the art need to manually arrange prefabricated teeth on a wax rim and adjust the positions, angles, and occlusal relationships of the teeth. This process is laborious, and is demanding about clinical experience and skill levels of those of ordinary skill in the art. As a result, it is difficult to ensure the accuracy and consistency of final products, and the production efficiency is also limited.

With the application of digital technology in the dental field, a digital denture fabrication solution based on computer-aided design/computer-aided manufacturing (CAD/CAM) emerges. The existing digital solutions mainly include integrated and split types. With the integrated solution, multi-layer material milling or 3D printing forming in one step is usually adopted, but the form and color of teeth are limited by blocks and the staining effect of gingivae is unstable. In the split solution, the dentition and a base are fabricated separately and then bonded. However, the bonding step is likely to result in additional precision errors, and long-term stability of adhesives is also challenging.

In addition, the related art generally fails to effectively integrate prefabricated teeth that are widely used clinically and have excellent material properties and high cost-effectiveness. How to seamlessly integrate the physical prefabricated teeth into the digital design and manufacturing process for exerting the efficiency of digital design and making use of existing advantages of the prefabricated teeth is an urgent problem in the field of denture fabrication.

SUMMARY OF THE INVENTION

An objective of embodiments of the present disclosure is to provide a method and system for digital fabrication of a denture, to solve the technical problems in the prior art that prefabricated teeth are difficult to apply to digital flows, a fabrication process depends on manual experience, and efficiency is low.

In a first aspect, the embodiments of the present disclosure provide a method for digital fabrication of a denture. The method includes:

editing attributes of a three-dimensional model of a prefabricated tooth, and establishing a template database including one or more three-dimensional models of the prefabricated tooth, where the attributes include a tooth position, a pose, and a feature marking point;

obtaining oral data of a patient, and performing tooth arrangement design and base design, where the tooth arrangement design includes selecting, from the template database or generating, according to a feature parameter of the patient, a corresponding three-dimensional model of the prefabricated tooth, and the tooth arrangement design and the base design are used to generate a virtual denture model representing a form of the denture;

determining, based on the virtual denture model, a three-dimensional model of a positioning auxiliary body for positioning a corresponding physical prefabricated tooth;

fabricating a materialized positioning auxiliary body according to the three-dimensional model of the positioning auxiliary body; and using the materialized positioning auxiliary body to physically position and arrange the physical prefabricated tooth corresponding to the three-dimensional model of the prefabricated tooth, and bonding the physical prefabricated tooth to a gingival base material, to form the denture.

In combination with the first aspect, in a possible implementation, the feature marking point of the attributes includes:

at least one of an occlusal surface marking point, a gingival margin marking point, a buccolingual marking point, and a mesiodistal marking point of the prefabricated tooth; and the attributes further include an overall dental arch form of a prefabricated tooth dentition and a relative spatial relationship between teeth in the dentition.

In combination with the first aspect, in a possible implementation, the step of selecting, from the template database, a corresponding three-dimensional model of the prefabricated tooth specifically includes:

marking an anatomical landmark point according to the oral data of the patient;

selecting a matching three-dimensional model of the prefabricated tooth by combining attributes of the dental arch form and a dentition width stored in the template database according to spatial information determined by the anatomical landmark point; and completing initial positioning arrangement based on a correspondence relationship between the anatomical landmark point and the tooth position in the three-dimensional model of the prefabricated tooth.

In combination with the first aspect, in a possible implementation, the tooth arrangement design includes performing three-dimensional pose adjustment on a single tooth, a segmented dentition, or an overall dentition based on the relative spatial relationship between the teeth.

In combination with the first aspect, in a possible implementation, the base design includes:

automatically generating a gingival line of a base according to a gingival margin marking point edited on the prefabricated tooth after virtual tooth arrangement design, and generating a base model based on the gingival line.

In combination with the first aspect, in a possible implementation, the base design further includes:

automatically adjusting, when the gingival margin marking point on any prefabricated tooth is detected to be lower than a preset first base safety thickness threshold, a position of the marking point to a height satisfying a requirement from the first threshold, and generating the gingival line.

In combination with the first aspect, in a possible implementation, after the virtual denture model is generated, and before the three-dimensional model of the positioning auxiliary body is generated, the method further includes:

computing, based on the virtual denture model, an area to be abraded when the prefabricated tooth is fitted to a base since the prefabricated tooth is exposed outside the base or intrudes into a minimum thickness of the base, to generate data of the area to be abraded.

In combination with the first aspect, in a possible implementation, the positioning auxiliary body is a tooth root abrading guide plate, and the step of generating the tooth root abrading guide plate includes:

processing, according to the data of the area to be abraded, a part to be kept in the three-dimensional model of the prefabricated tooth, to generate a three-dimensional model of the tooth root abrading guide plate, where the tooth root abrading guide plate is provided with an inner cavity matching the part to be kept in the prefabricated tooth, to expose the area to be abraded after the physical prefabricated tooth is inserted.

In combination with the first aspect, in a possible implementation, a digital identifier of a tooth position number or a prefabricated tooth model for identification is further arranged on an outer wall of the three-dimensional model of the tooth root abrading guide plate.

In combination with the first aspect, in a possible implementation, the positioning auxiliary body is a flasking guide plate, and a method for generating the flasking guide plate includes:

processing the virtual denture model to generate an inner wall and an outer wall that have a preset second thickness, and dividing, based on a preset cutting line, a generated model into a bottom plate and a snapping plate that are detachable.

In combination with the first aspect, in a possible implementation, snap-fit recesses or positioning structures that match mutually are provided in edges of the bottom plate and the snapping plate of the flasking guide plate, and an injection channel for injecting the gingival base material and an overflow hole for exhausting air are further provided in the flasking guide plate.

In combination with the first aspect, in a possible implementation, the using the materialized positioning auxiliary body to physically position and arrange the physical prefabricated tooth corresponding to the three-dimensional model of the prefabricated tooth, and bonding the physical prefabricated tooth to a gingival base material, to form the denture include:

coating an inner cavity of the flasking guide plate with a separating agent;

putting the physical prefabricated teeth subjected to abrasion into corresponding tooth position impressions in an inner cavity of the bottom plate of the flasking guide plate one by one;

covering and fixing the snapping plate, and injecting the liquid gingival base material through the injection channel; and opening the flasking guide plate after the gingival base material is solidified, and taking out a molded denture.

In combination with the first aspect, in a possible implementation, after the taking out a molded denture, the method further includes:

performing three-dimensional scanning on the molded denture, and obtaining actual three-dimensional data;

comparing an original virtual denture model with the actual three-dimensional data, and computing a deviation; and driving a finishing apparatus to perform automatic finishing on the molded denture according to the deviation.

In combination with the first aspect, in a possible implementation, the positioning auxiliary body is a tooth guide plate, and a method for generating the tooth guide plate includes:

fusing the virtual denture model and a digital work model of the patient into an integrated model by a Boolean operation, and processing an area including a crown form on the integrated model, to generate the tooth guide plate with an inner surface of a female mold form.

In combination with the first aspect, in a possible implementation, the step of using the materialized positioning auxiliary body includes:

putting the physical prefabricated teeth into corresponding female mold forms of the tooth guide plate one by one;

positioning the tooth guide plate loaded with the physical prefabricated teeth on the work model of the patient;

performing wax filling between the physical prefabricated teeth and the work model to form a wax base, and forming a wax pattern of the denture; and adopting a lost-wax process for flasking, investment, dewaxing, and material injection based on the wax pattern of the denture, to fabricate the denture.

In combination with the first aspect, in a possible implementation, the virtual denture model is a split virtual model, and steps of generating the split virtual model include:

performing a virtual Boolean subtraction operation on the three-dimensional model of each prefabricated tooth according to data of an area to be abraded;

fusing all the three-dimensional models of the prefabricated teeth after the virtual subtraction operation into a dentition model; and performing the Boolean subtraction operation on a base model by using the dentition model, to generate sockets on the base model for accommodating the physical prefabricated teeth.

In a second aspect, the embodiments of the present disclosure provide a system for digital fabrication of a denture. The system includes:

a data templating module configured to edit attributes of a three-dimensional model of a prefabricated tooth, and establish a template database including one or more three-dimensional models of the prefabricated tooth, where the attributes include a tooth position, a pose, and a feature marking point;

a virtual design module configured to obtain oral data of a patient, and perform tooth arrangement design and base design, to generate a virtual denture model representing a form of the final denture; and a positioning auxiliary body generating module configured to generate, based on the virtual denture model, a three-dimensional model of a positioning auxiliary body used for accurately positioning a corresponding physical prefabricated tooth in a subsequent physical fabrication process.

In combination with the second aspect, in a possible implementation, the virtual design module is further configured to compute an area to be abraded from the physical prefabricated tooth when the prefabricated tooth is fitted to a base, to generate data of the area to be abraded, and the positioning auxiliary body generating module is further configured to generate a three-dimensional model of a tooth root abrading guide plate according to the data of the area to be abraded.

In combination with the second aspect, in a possible implementation, the positioning auxiliary body generating module is specifically configured to:

process and segment the virtual denture model, to generate a flasking guide plate model; or fuse and process the virtual denture model and a work model, to generate a tooth guide plate model.

The embodiments of the present disclosure have the following beneficial effects:

In the embodiments of the present disclosure, the digital template database of the prefabricated teeth is established, the attributes are used to assist in tooth arrangement, and the physical prefabricated teeth are integrated into a digital workflow. Thus, the difficulty in efficiently utilizing the prefabricated tooth in a digital solution is solved.

In addition, the embodiment of the present disclosure accurately transmits a tooth arrangement result in a virtual design stage to a physical production stage by generating and using the positioning auxiliary body. Thus, accuracy of final arrangement positions of the prefabricated teeth is guaranteed, serious dependence on personal experience and manual skills of those of ordinary in the art is eliminated, and technical thresholds are significantly lowered.

BRIEF DESCRIPTION OF THE DRAWINGS

To describe technical solutions in the embodiments of the present disclosure more clearly, accompanying drawings required by description of the embodiments of the present disclosure will be briefly described below. Apparently, the accompanying drawings in the following description merely show some embodiments of the present disclosure, and those of ordinary skill in the art can still derive other accompanying drawings from these accompanying drawings without creative efforts.

DESCRIPTION OF EMBODIMENTS

In order to make objectives, technical solutions, and advantages of the present disclosure clearer, the present disclosure will be further described below in detail with reference to accompanying drawings and embodiments. It should be understood that specific embodiments described herein are merely used to explain the present disclosure rather than limit the present disclosure. Based on the embodiments of the present disclosure, all other embodiments derived by those of ordinary skill in the art without creative efforts fall within the protection scope of the present disclosure.

It should be noted that if there is no conflict, all features in the embodiments of the present disclosure can be combined with each other, which fall within the protection scope of the present disclosure. In addition, although functional modules are divided in the schematic diagram of the device and logical order is shown in the flowchart, in some cases, the steps shown or described can be performed based on functional division different from that in the device or in an order different from that in the flowchart. In addition, the words such as "first", "second", and "third" used in the present disclosure do not constitute limitation to the data or performing order, but merely distinguish the same or similar items with basically the same function and effect.

Before the embodiment of the present disclosure, it is necessary to explain the limitation of an existing digital denture fabrication solution. As mentioned above, the existing denture fabrication technology has obvious limitation regardless of manual-based traditional technology or preliminary digital solution (such as integrated or split printing/milling). The traditional technology is demanding about experience and manual skills of technicians, has a complicated process, and is difficult in accuracy guarantee. However, the existing digital solution fails to effectively use prefabricated teeth with better physical properties and aesthetic effects, results in high costs or poor final effects, and is disconnected with mature traditional technology.

In order to solve the above problems, the present disclosure provides a method and system for fabrication of a denture, and related auxiliary tools that deeply fuse traditional prefabricated teeth with modern digital design and fabrication. This solution systematically integrates the entire process from data acquisition, virtual design, auxiliary tool generation to physical production, aims at lowering the technical threshold, improving efficiency and accuracy, and retaining the advantages of mature materials and processes.

Figure 1:
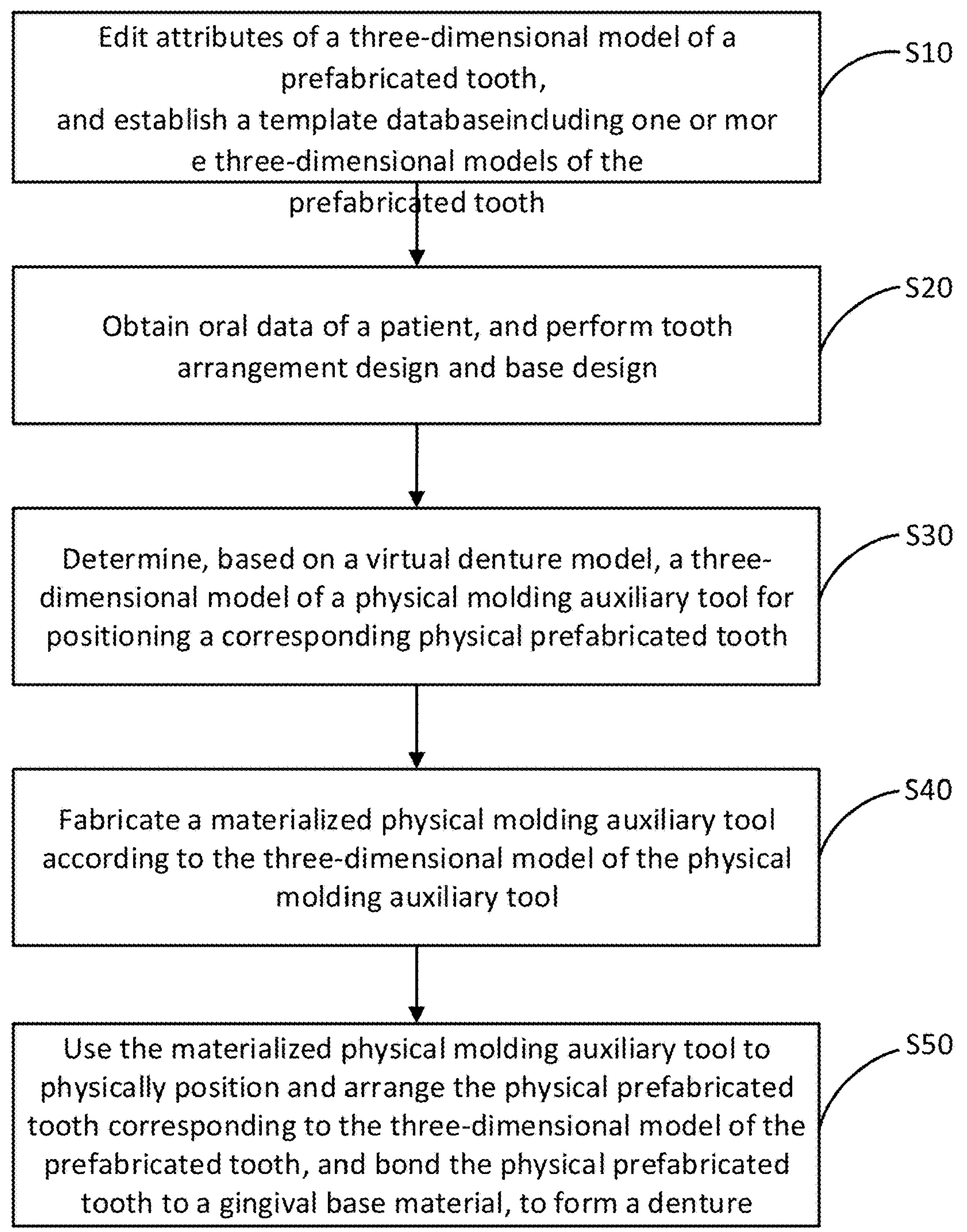
FIG. 1 is a schematic flowchart of a method for digital fabrication of a denture according to an embodiment of the present disclosure.

In a first aspect, with reference to FIG. 1, the embodiments of the present disclosure provide a method for digital fabrication of a denture. The method includes:

- step S10, attributes of a three-dimensional model of a prefabricated tooth are edited, and a template database including one or more three-dimensional models of the prefabricated tooth is established, where the attributes include a tooth position, a pose, and a feature marking point;
- step S20, oral data of a patient are obtained, and tooth arrangement design and base design are performed, where the tooth arrangement design includes selecting, from the template database or generating, according to a feature parameter of the patient, a corresponding three-dimensional model of the prefabricated tooth, and the tooth arrangement design and the base design are used to generate a virtual denture model representing a form of the final denture;
- step S30, based on the virtual denture model, a three-dimensional model of a positioning auxiliary body is generated for positioning physical prefabricated teeth;
- step S40, a materialized positioning auxiliary body is fabricated according to the three-dimensional model of the positioning auxiliary body; and
- step S50, the materialized positioning auxiliary body is used to physically position and arrange the physical prefabricated tooth corresponding to the three-dimensional model of the prefabricated tooth, and the physical prefabricated tooth is bonded to a gingival base material, to form the denture.

Figure 2:
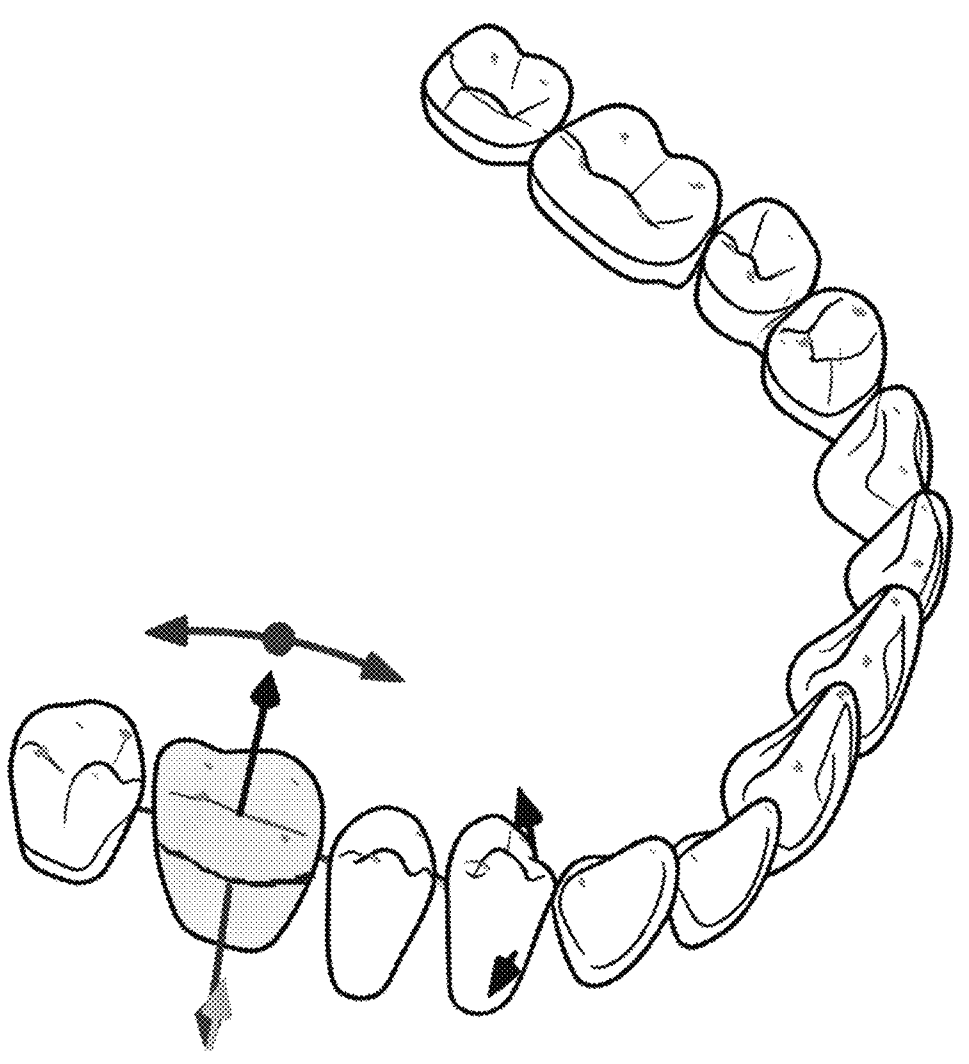
FIG. 2 is a schematic diagram of a three-dimensional model of prefabricated teeth according to an embodiment of the present disclosure.

In this embodiment, the attributes of the three-dimensional models of the prefabricated teeth are edited, and the template database including one or more of the three-dimensional models of the prefabricated teeth is established. As shown in FIG. 2, the three-dimensional model of the prefabricated tooth may be obtained by scanning commercial physical prefabricated teeth with a high-precision 3D scanner, or directly obtained from a design source file of a prefabricated tooth manufacturer. In a special template editor, each three-dimensional model of the prefabricated tooth is given structured attribute information. These attributes include a unique tooth position (for example, according to Fédération Dentaire Internationale (FDI) tooth numbering), a standard pose in a three-dimensional coordinate system (for example, a buccal orientation and an occlusal surface orientation) and a series of key feature marking points.

Then, the oral data of the patient are obtained, for example, by an intraoral scanner or scanning a physical impression, and a digital work model including information such as an alveolar ridge, the remaining teeth, and related soft tissues is obtained. Based on this model, the tooth arrangement design and the base design are performed. In the process of the tooth arrangement design, a set of suitable three-dimensional models of prefabricated teeth may be selected from the template database, or personalized three-dimensional models of prefabricated teeth may be generated by an algorithm according to special feature parameters of the patient (such as a dental arch size and a facial features). The tooth arrangement design is combined with the subsequent base design, and finally the virtual denture model representing the form of the final denture is generated in software.

Next, based on the virtual denture model, the three-dimensional model of the positioning auxiliary body used for positioning corresponding physical prefabricated teeth in the subsequent physical fabrication process is determined and generated. As a key bridge connecting digital design and physical fabrication, a specific form of the positioning auxiliary body changes according to a selected fabrication process.

Then, the materialized positioning auxiliary body is fabricated by an additive or subtractive manufacturing method such as 3D printing or computer numerical control (CNC) milling according to the three-dimensional model of the positioning auxiliary body.

Finally, by using the materialized positioning auxiliary body, the technicians can physically position and arrange the physical prefabricated teeth corresponding to the three-dimensional models of the prefabricated teeth selected during design in a rapid and accurate manner, and bond the physical prefabricated teeth to the gingival base material (such as polymerizable resin), to form the final restoration denture. This process greatly simplifies the most complicated and time-consuming manual tooth arrangement step in the traditional technology.

In this embodiment, it is necessary to reasonably edit the attributes of the three-dimensional model of the prefabricated teeth when establishing the template database. As shown in FIG. 2, the feature marking points in the attribute may include an occlusal surface marking points (such as a cusp point and central fovea) for automatically aligning an occlusal relationship, a gingival margin marking point for automatically generating a contour of the base, a buccolingual marking point for pose adjustment reference, and a mesiodistal marking point. Further, in order to implement rapid and harmonious dentition arrangement, the attributes may also include an overall dental arch form of a prefabricated tooth dentition (such as square and oval) and a relative spatial relationship between the teeth in the dentition, such as interproximal contact, overbite and overjet. These highly structured data lay the foundation for the subsequent automatic tooth arrangement design.

Figure 3:
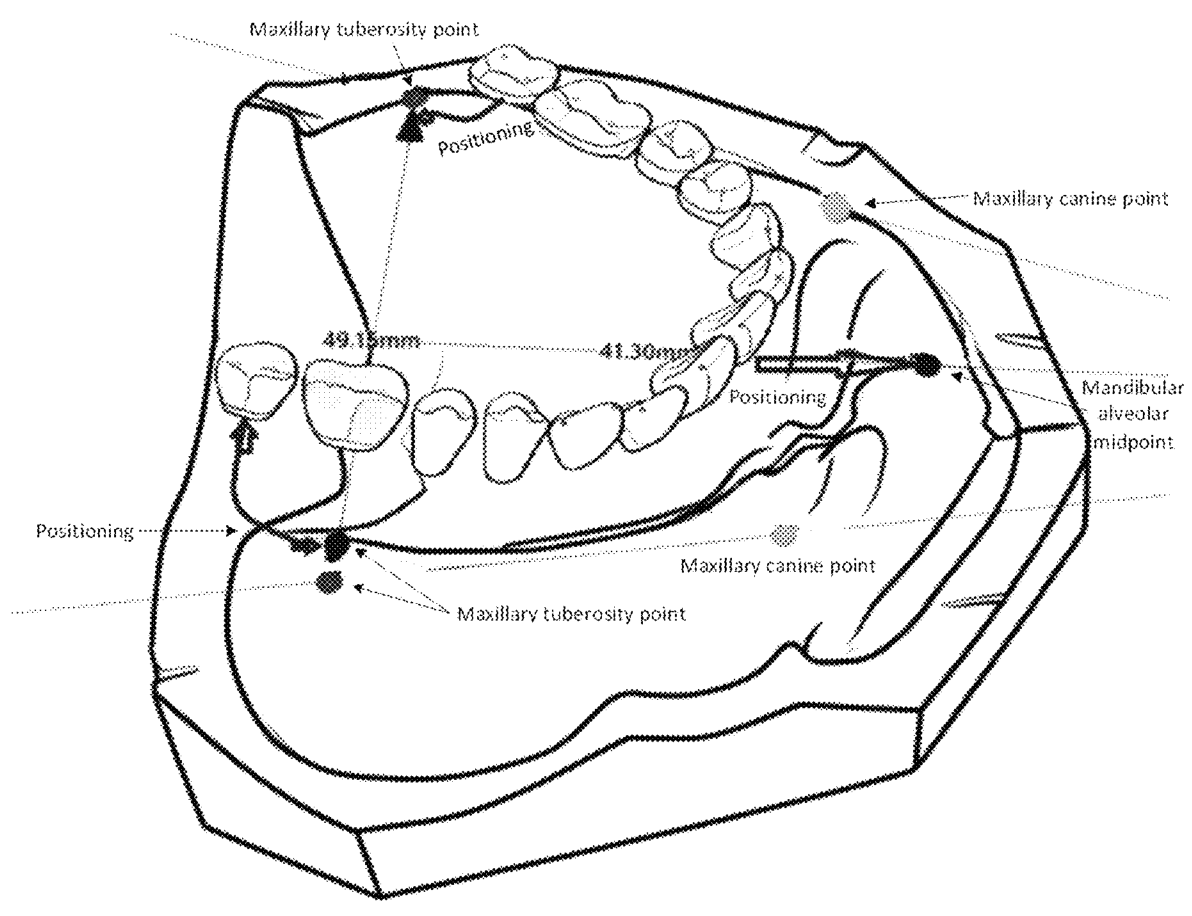
FIG. 3 is a schematic diagram of initial positioning according to an embodiment of the present disclosure.

In this embodiment, during the tooth arrangement design, the step that the models of the prefabricated teeth are selected from the template database includes:

First of all, in computer-aided design (CAD) software, according to the oral data (a digital model of an edentulous jaw) of the patient, the technician or algorithm automatically marks key anatomical landmark point, such as maxillary tubercle, incisor papilla, mandibular retromolar pad, or dental arch midline inferred from a form of alveolar ridge. Then, the system intelligently compares the spatial information such as a dental arch width and length determined by these anatomical landmark points with the attributes including the dental arch form and dentition width stored in the template database, and performs selection and then automatically recommends one or more sets of the most matching three-dimensional models of the prefabricated teeth. As shown in FIG. 3, after selection, initial positioning arrangement may be quickly completed based on the correspondence relationship between anatomical landmark point (such as an inferred position of No. 7 tooth) and tooth position in the three-dimensional model of the prefabricated tooth. Based on this, the technician may use a three-dimensional pose adjustment tool provided by the software to fine-tune, through movement and rotation, of a single tooth, a segmented dentition (such as anterior dentition), or an overall dentition, to satisfy individualized aesthetic and functional requirements. The adjustment is performed based on the relative spatial relationship between the teeth.

Figure 4:
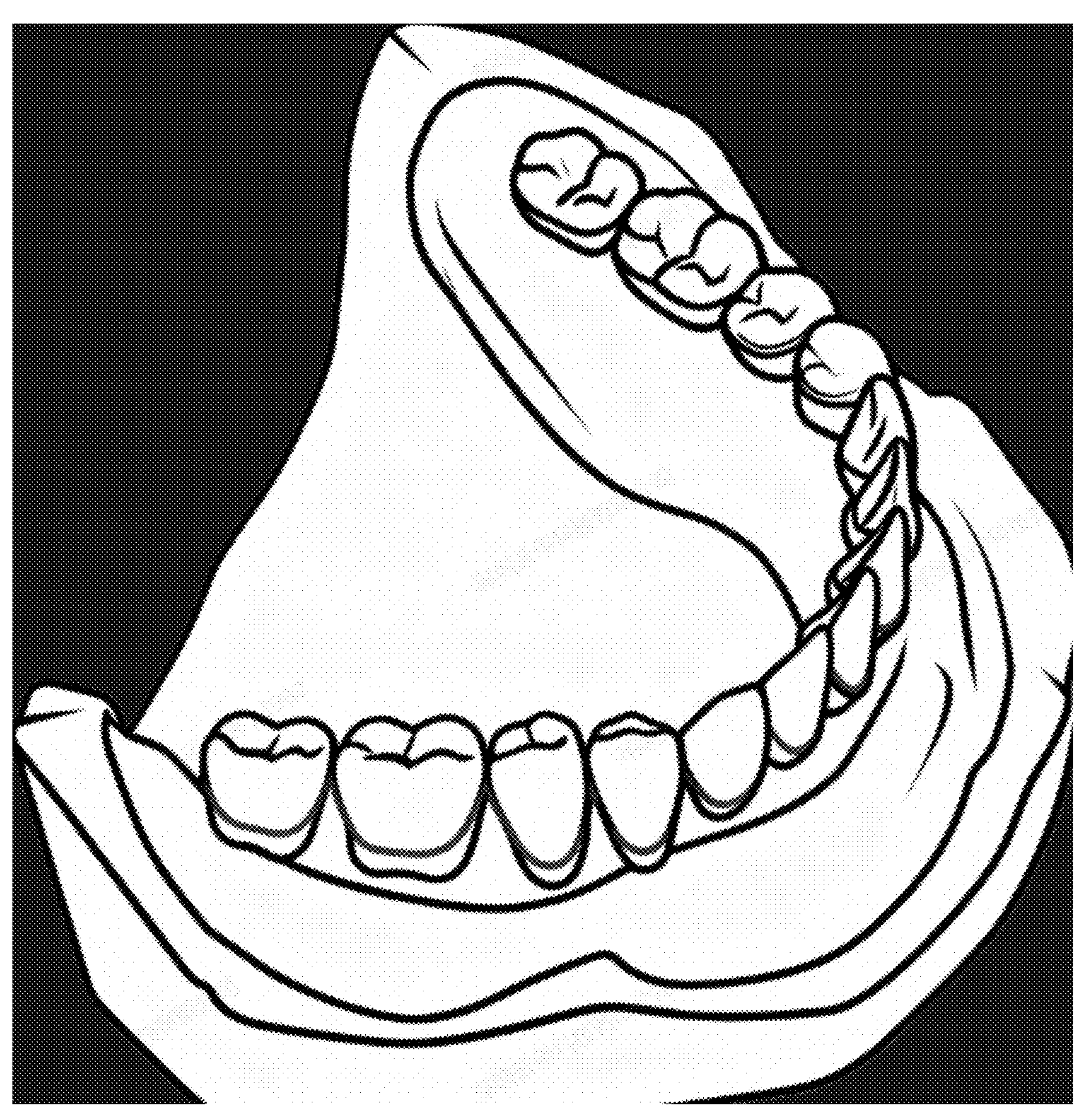
FIG. 4 is a schematic diagram of a gingival line according to an embodiment of the present disclosure.

In some embodiments, the base design is performed after the tooth arrangement design is completed. As shown in FIG. 4, a preferred solution is that the edited gingival margin marking point on each prefabricated tooth after the virtual tooth arrangement may be automatically extracted, to be fitted into a continuous and smooth base gingival line along the dental arch. Then, through extension to the alveolar ridge based on the gingival line, in combination with preset parameters such as the thickness of the base and the extension range of the edge, the base model is automatically generated. In order to ensure the structural strength of the final denture, the base design may also include an automatic inspection and adjustment step: when it is detected that the gingival margin marking point on any prefabricated tooth is too close to the alveolar ridge in a vertical direction, a thickness of a base formed here in the future is lower than a preset first base safety thickness threshold (for example, 2 mm), a position of the marking point may be automatically adjusted upwards (in a direction away from the alveolar ridge) to a height just satisfying a requirement from the threshold, and then a final gingival line is generated.

Figure 5:
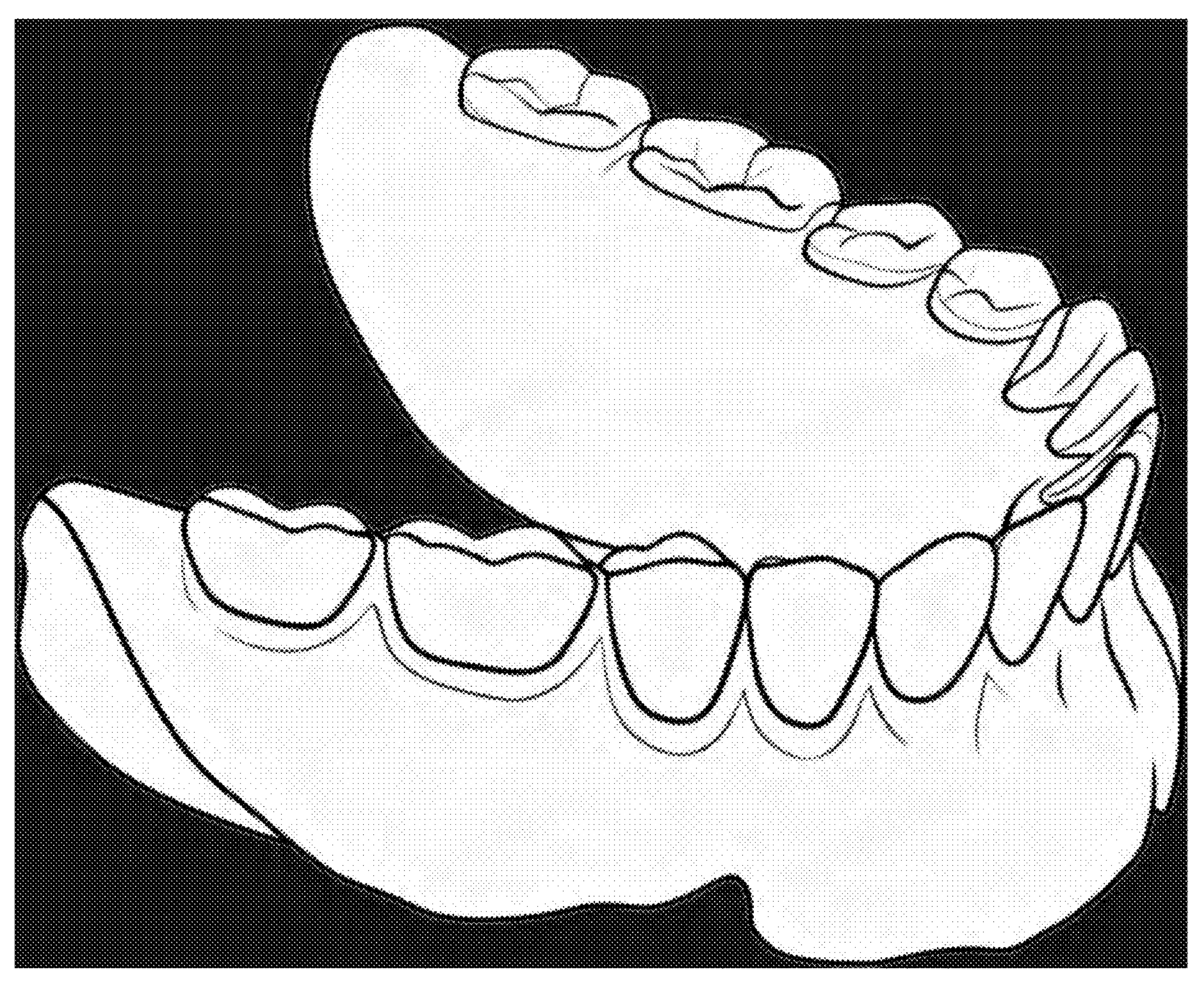
FIG. 5 is a schematic diagram of a virtual denture model according to an embodiment of the present disclosure.

Finally, the adjusted prefabricated tooth dentition is combined with the generated base model to form the virtual denture model representing the form of the final denture as shown in FIG. 5.

In some embodiments, before the three-dimensional model of the positioning auxiliary body is generated, based on the virtual denture model, an area to be abraded when the prefabricated tooth is fitted to a base since the prefabricated tooth is exposed outside the base or intrudes into a minimum thickness of the base is computed, to generate data of the area to be abraded.

It is easy to understand, because the commercial physical prefabricated teeth usually have a complete tooth root form, for perfect embedding into the base and ensuring sufficient structural strength of the base in the personalized denture design, the tooth root part often needs to be accurately abraded and trimmed.

Based on this, the virtual denture model may be processed into different forms to adapt to different fabrication paths. One is the integrated virtual denture model as shown in FIG. 5. All three-dimensional models of prefabricated teeth and the base model are fused into a whole through a Boolean operation, which is usually used to guide integrated milling or printing.

Figure 6:
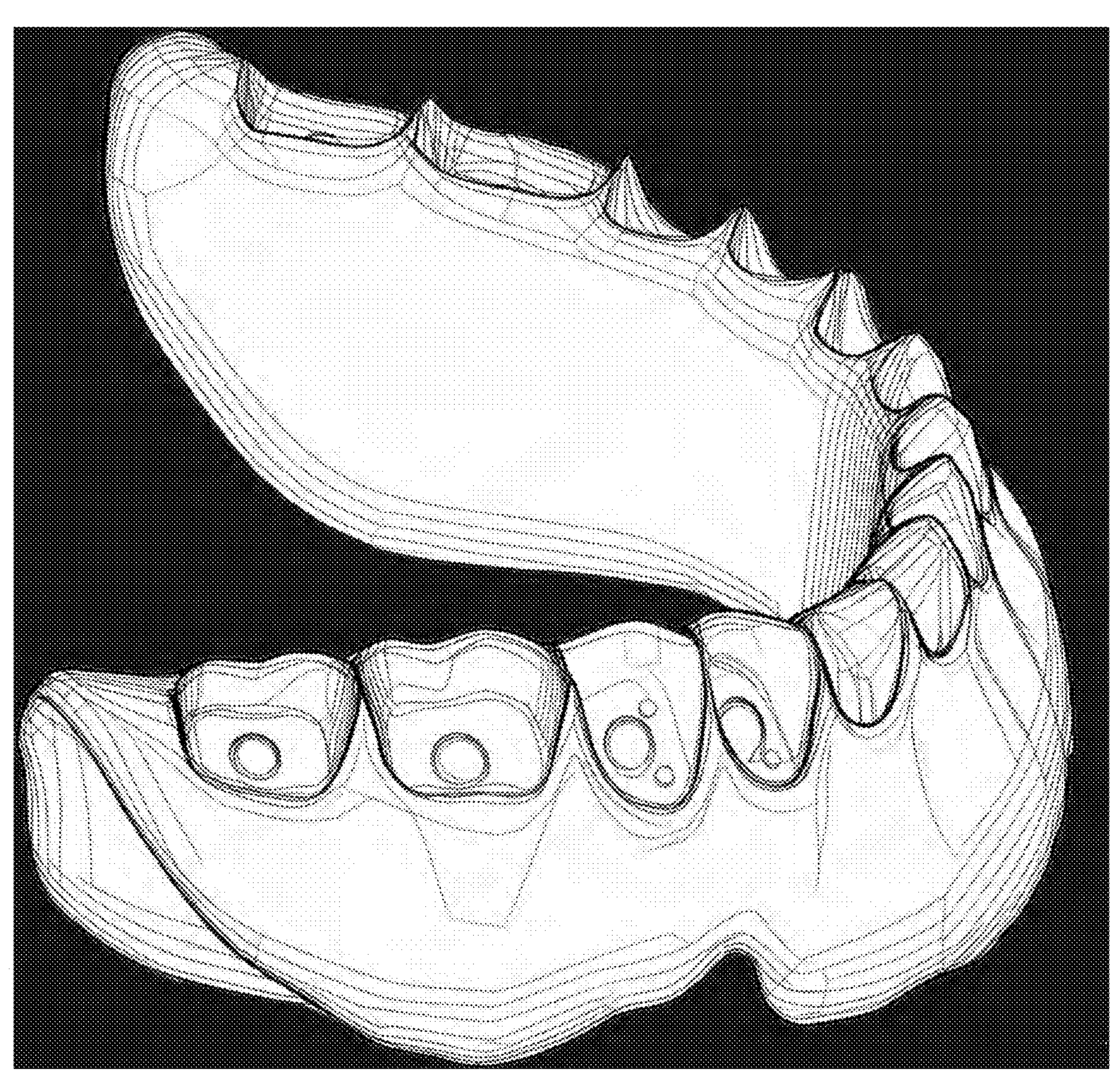
FIG. 6 is a schematic diagram of partial socket preparation of a base in a split denture model according to an embodiment of the present disclosure.
Figure 7:
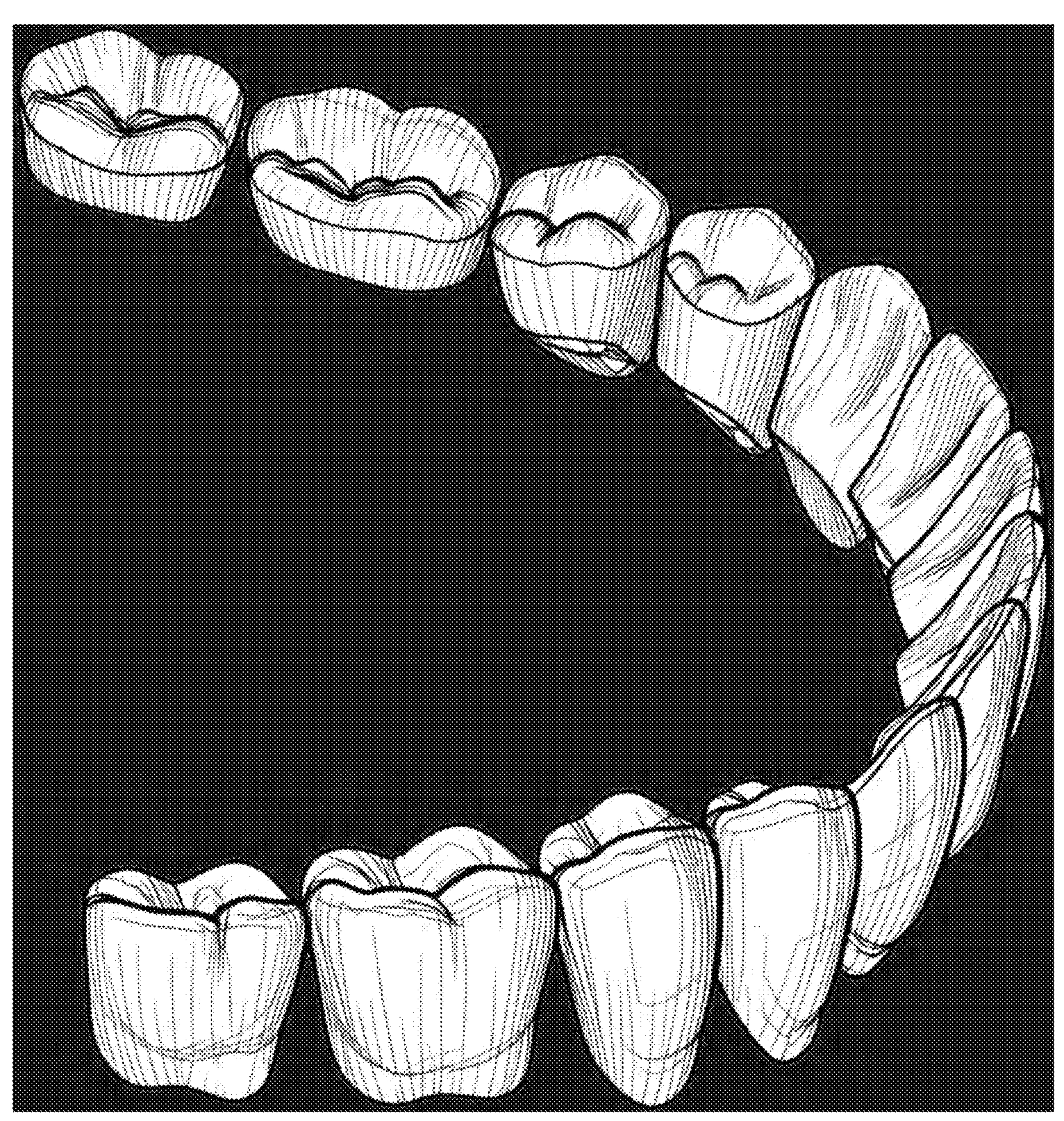
FIG. 7 is a schematic diagram of partial socket preparation of a base in another split denture model according to an embodiment of the present disclosure.

The other is a split virtual model including generation steps as follows:

first of all, according to the data of the area to be abraded computed above, a virtual Boolean subtraction operation is performed on the original three-dimensional model of each prefabricated tooth in the database, to obtain a prefabricated tooth form abraded. Then, all the three-dimensional models of the prefabricated teeth subjected to the virtual subtraction operation are fused into an overall dentition model in the software. Finally, as shown in FIG. 6 and FIG. 7, the dentition model is used to perform the Boolean subtraction operation on the base model. Such an operation is used for socket preparation. As a result, a socket (or cavity) for accommodating the root of the physical prefabricated tooth is accurately generated on the base model. The split model is very important for subsequent split fabrication and assembly, as well as the design of various auxiliary tools.

Figure 15:
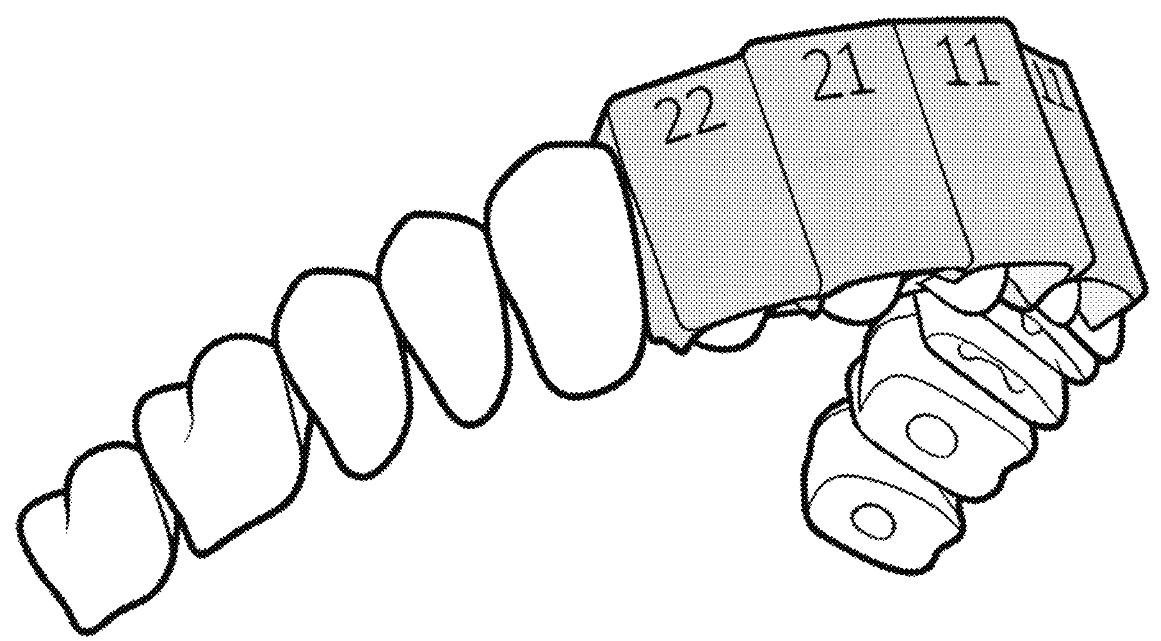
FIG. 15 is a schematic diagram of a perspective structure of a tooth root abrading guide plate according to an embodiment of the present disclosure.
Figure 16:
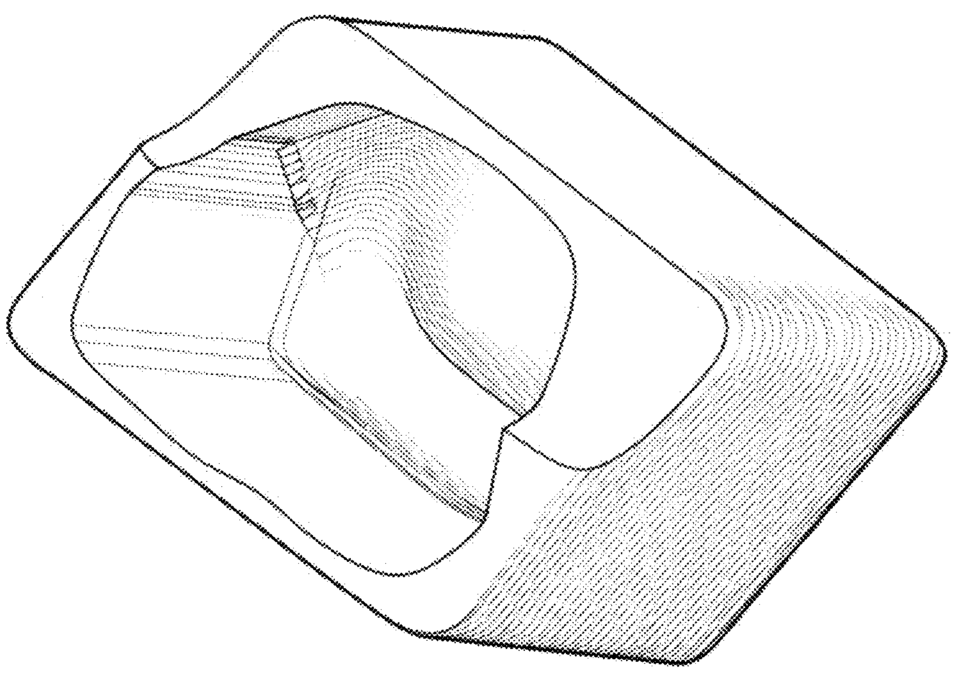
FIG. 16 is a schematic diagram of a tooth root abrading guide plate accommodating a single prefabricated tooth according to an embodiment of the present disclosure.
Figure 17:
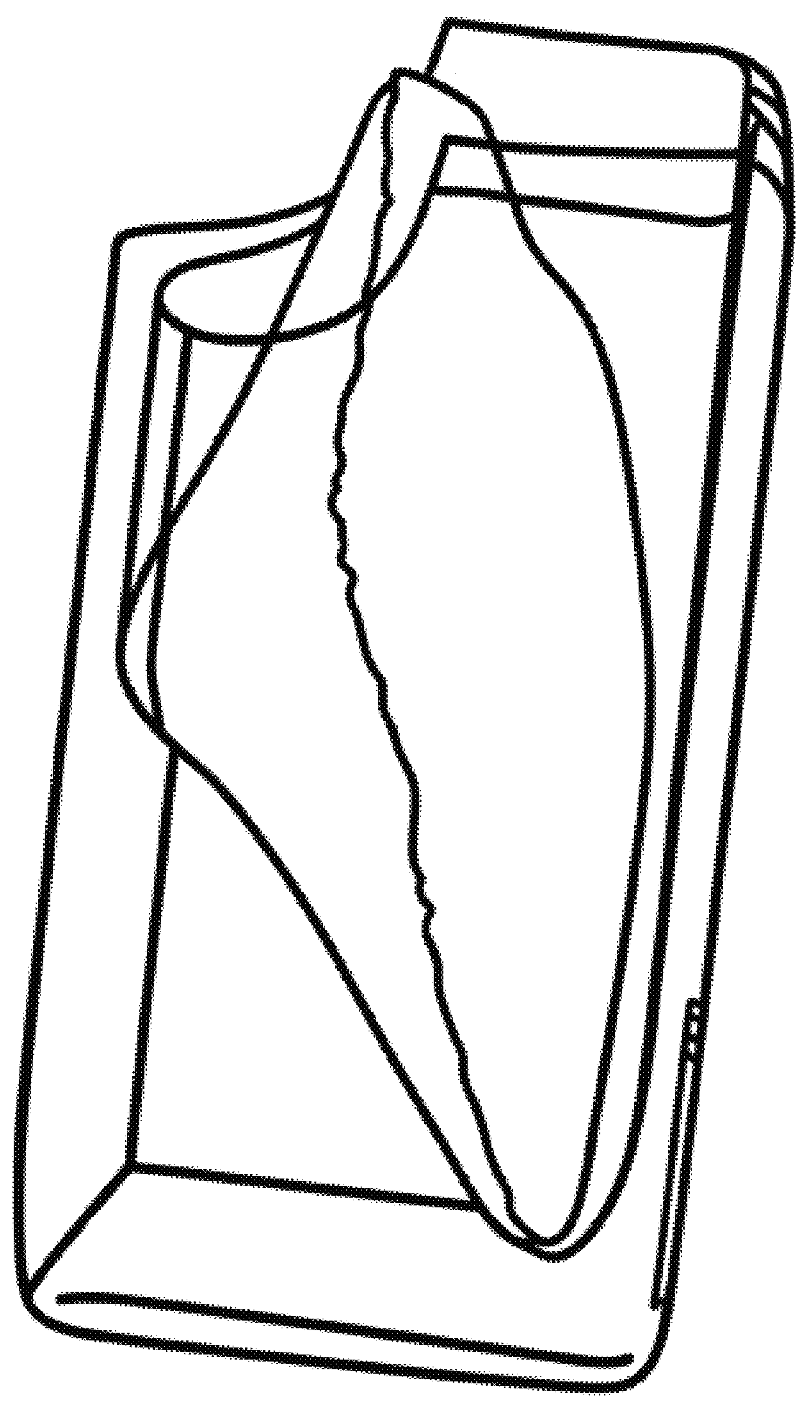
FIG. 17 is a schematic diagram of tooth trimming by using a tooth root abrading guide plate according to an embodiment of the present disclosure.

Further, this embodiment provides a specific positioning auxiliary body-the tooth root abrading guide plate, and for its structure and application, reference can be made to FIG. 15 to FIG. 17.

The tooth root abrading guide plate is specially designed to guide the technician to accurately and efficiently abrade and modify the physical prefabricated tooth, to make the prefabricated tooth perfectly match with the designed base. The generation steps are as follows:

After the data of the area to be abraded of each prefabricated tooth in the embodiment is computed, a part to be kept of each tooth may be determined in reverse. According to the data of the area to be abraded, the three-dimensional model of the tooth root abrading guide plate is generated through outward offset or coating on the part to be kept in the three-dimensional model of the prefabricated tooth. As shown in FIG. 16, the guide plate has an inner cavity that accurately matches the part to be kept of the prefabricated tooth. When the technician completely puts an untreated physical prefabricated tooth into the inner cavity of the guide plate, a tooth root area that needs to be abraded is accurately exposed out of the guide plate, and the part to be kept is completely covered and protected by the guide plate. As shown in FIG. 17, the technician only needs to use an abrading machine and other tools to abrade and remove all exposed parts along an edge of the guide plate.

In some embodiments, in order to further improve convenience of operation and prevent confusion during processing of a plurality of teeth, a digital identifier of a tooth position number or a prefabricated tooth model for identification is further arranged on an outer wall of the three-dimensional model of the tooth root abrading guide plate. When a materialized guide plate is fabricated through 3D printing, these marks are also molded together. In this way, the technician can quickly match the guide plate with a corresponding prefabricated tooth, and implement accurate and standardized preprocessing. The guide plate may be designed separately for a single tooth, or the guide plates of one side or all tooth positions may be connected into a whole.

Figure 8:
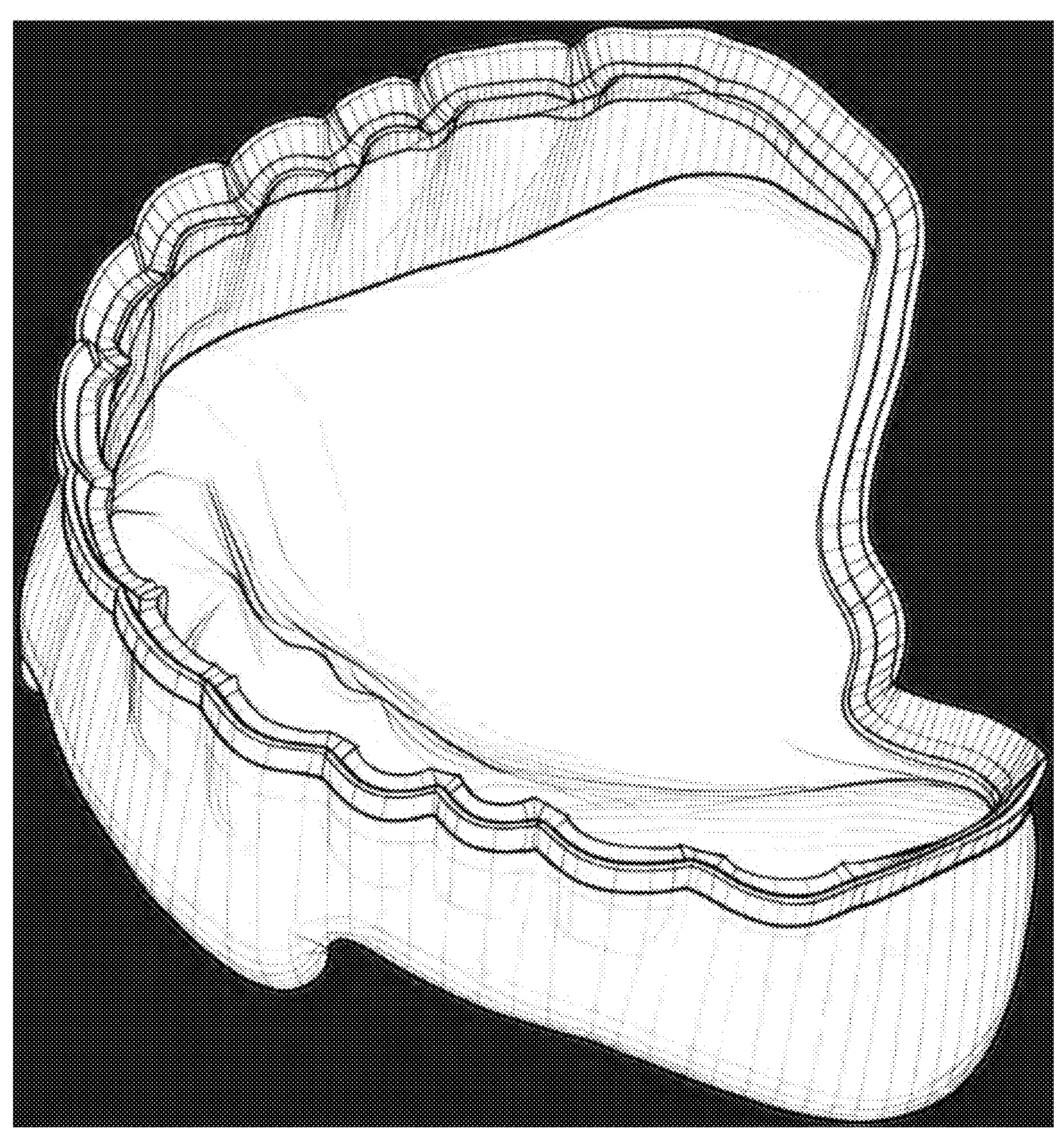
FIG. 8 is a schematic diagram of a flasking guide plate according to an embodiment of the present disclosure.
Figure 9:
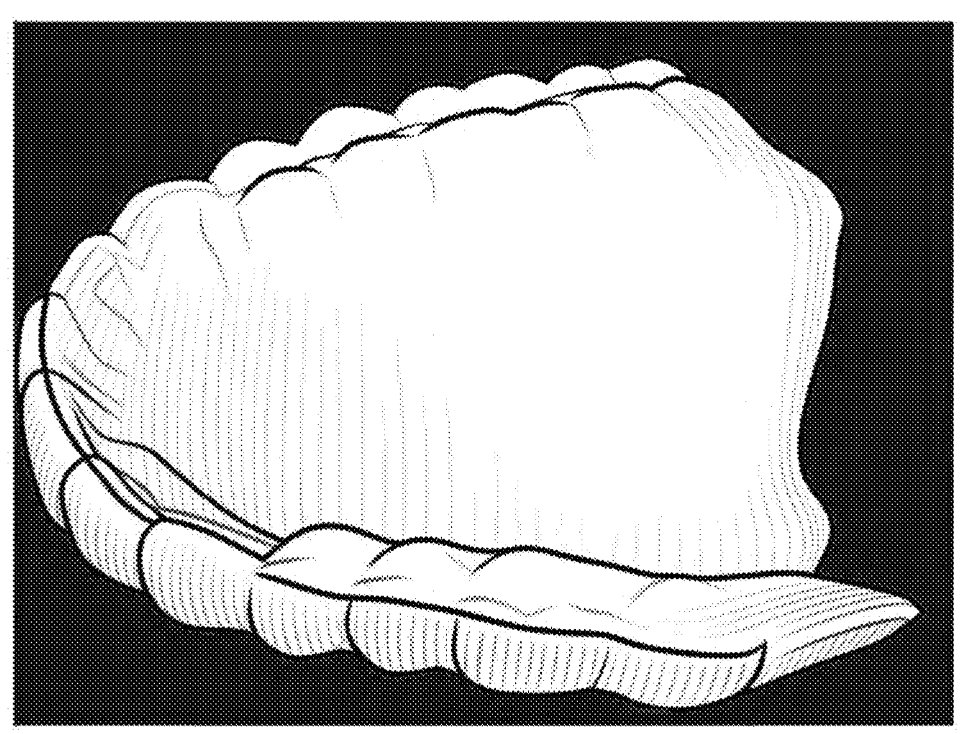
FIG. 9 is a schematic diagram of another flasking guide plate according to an embodiment of the present disclosure.
Figure 10:
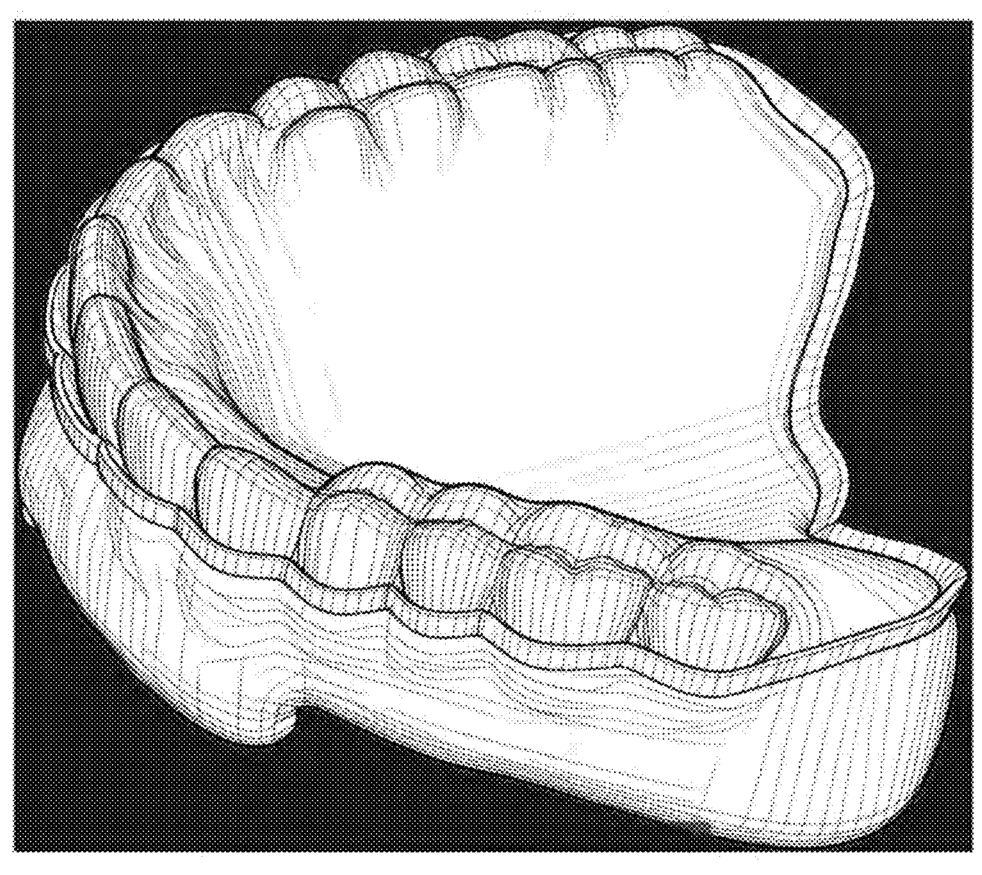
FIG. 10 is a schematic diagram of yet another flasking guide plate according to an embodiment of the present disclosure.

This embodiment provides another positioning auxiliary body-a flasking guide plate, and for its structure and application, reference can be made to FIG. 8 to FIG. 10. This solution simulates a flasking-material flushing process in traditional denture fabrication, but implements customization of a mold and simplification of the process by digital means.

Specifically, a method for generating the flasking guide plate includes: three-dimensional processing, for example, outward shelling or equidistant offset is performed on the virtual denture model generated in Embodiment 2, to generate an inner wall and an outer wall that have a preset second thickness (for example, 3 mm to 5 mm). Then, with a preset cutting line (usually located near the gingival line or at a position convenient in mold opening), a generated shell model is divided in the software into two or more detachable parts, typically a bottom plate and a snapping plate, as shown in FIG. 8.

In order to ensure that the materialized bottom plate and snapping plate may be accurately aligned and firmly combined during mold closing. Preferably, splicing edges of the materialized bottom plate and snapping plate are provided with mutually matching snap-fit recesses, positioning pins/holes or other positioning structures. In addition, as shown in FIG. 9 and FIG. 10, functional structures are further designed in advance on the flasking guide plate. For example, an injection channel for injecting a liquid gingival base material (such as self-setting resin) and an overflow hole for exhausting air from the mold during material injection and ensuring that materials are completely filled.

More specifically, a specific process of fabricating the denture by using the materialized flasking guide plate is as follows: first of all, a layer of separating agent is carefully coated on an inner cavity of the flasking guide plate (including the bottom plate and the snapping plate) printed through 3D. Secondly, the physical prefabricated teeth processed by the tooth root abrading guide plate are put into corresponding tooth position female mold impressions in an inner cavity of the bottom plate of the flasking guide plate one by one. Next, the snapping plate is covered and is fixed tightly to the bottom plate by using a buckle or an external fixture. Then, the liquid gingival base material is injected into the inner cavity of a closed guide plate through the preset injection channel until the material overflows the overflow hole. After the gingival base material is completely cured at a room temperature or in a pressure cooker, the flasking guide plate is opened and a molded denture with perfect combination of the prefabricated tooth and the base is taken out. Finally, the denture is abraded and polished.

Further, in order to obtain higher accuracy, this embodiment may further include an optional automatic finishing process:

After the molded denture is taken out, high-precision three-dimensional scanning is performed on the molded denture, and actual three-dimensional data are obtained. Then, the actual three-dimensional data and the original virtual denture model are aligned and compared in the software with a deviation therebetween computed. Finally, according to computed deviation data, a five-axis computer numerical control machine and other finishing apparatuses are driven to perform automatic fine trimming on the molded denture, to eliminate a fabrication error and obtain the final product highly consistent with the original design.

Further, this embodiment further provides a third positioning auxiliary body-a tooth guide plate, and for its structure and application, reference can be made to FIG. 11 to FIG. 14.

Figure 11:
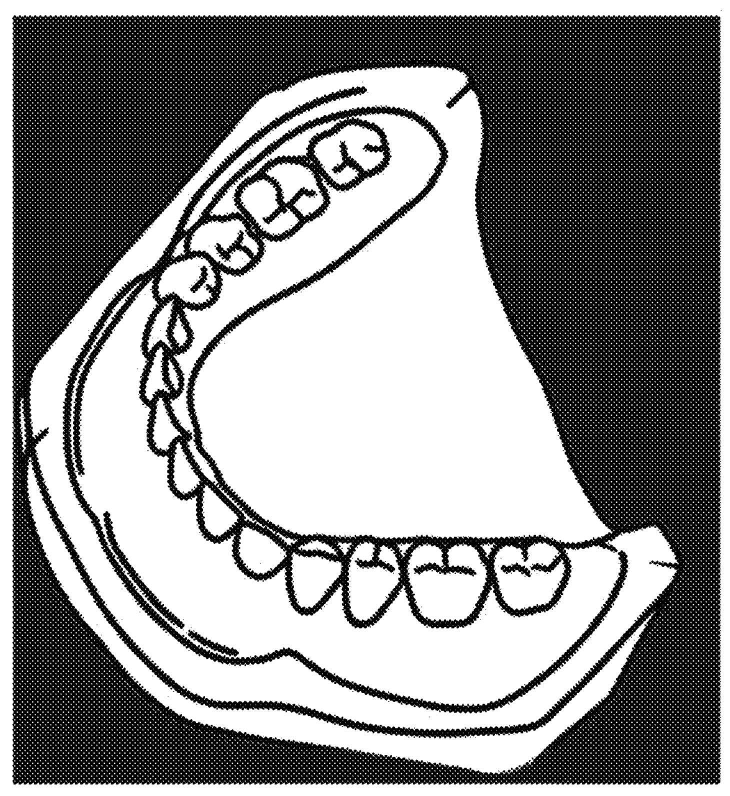
FIG. 11 is a schematic diagram of a tooth guide plate according to an embodiment of the present disclosure.
Figure 13:
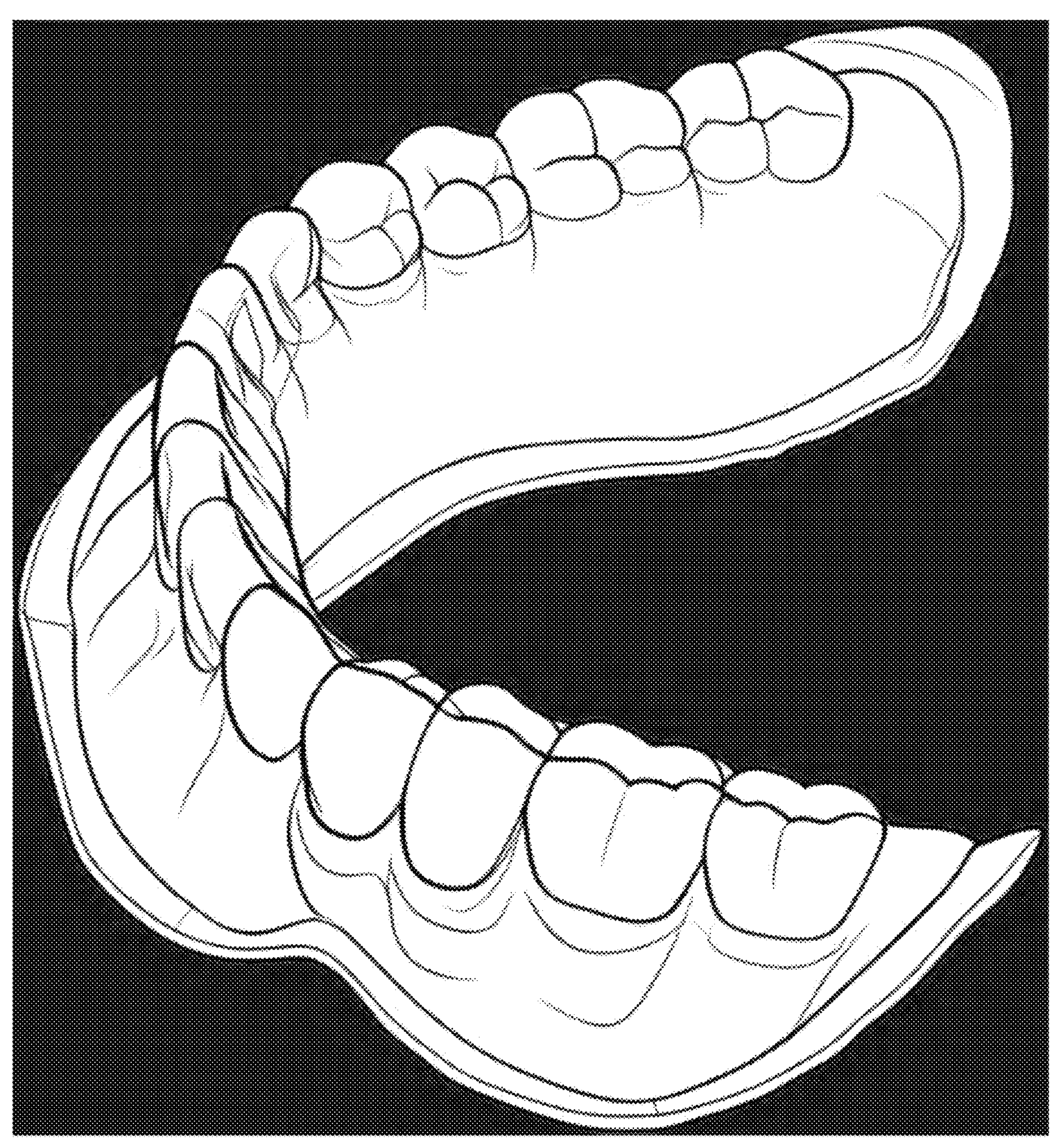
FIG. 13 is a schematic diagram of a tooth female mold contour of a bottom surface of a tooth guide plate according to an embodiment of the present disclosure.

A method for generating the tooth guide plate is as follows: first of all, in the software, the virtual denture model generated in Embodiment 2 and a digital work model of the patient (usually a digital version of a plaster model) are subjected to a Boolean operation, to be fused into an integrated model. Then, an area including a crown form on the integrated model is processed, for example, through outward shelling or offset, to generate the tooth guide plate with an inner surface of a female mold form, as shown in FIG. 11 and FIG. 13, and the inner surface is an accurate negative impression of all prefabricated tooth crowns.

Figure 12:
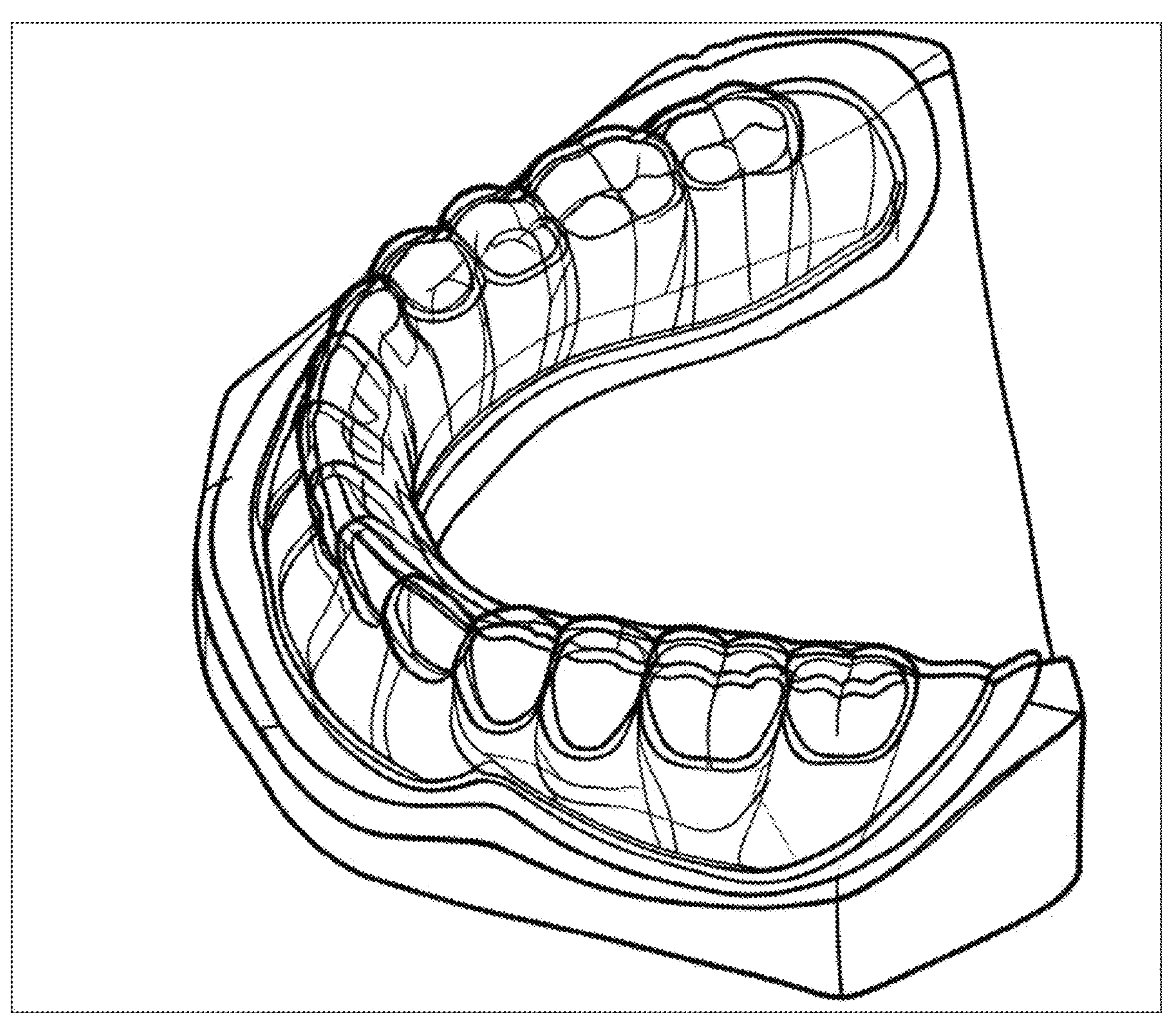
FIG. 12 is a schematic diagram of a tooth guide plate and a work model that are in a bonded state according to an embodiment of the present disclosure.
Figure 14:
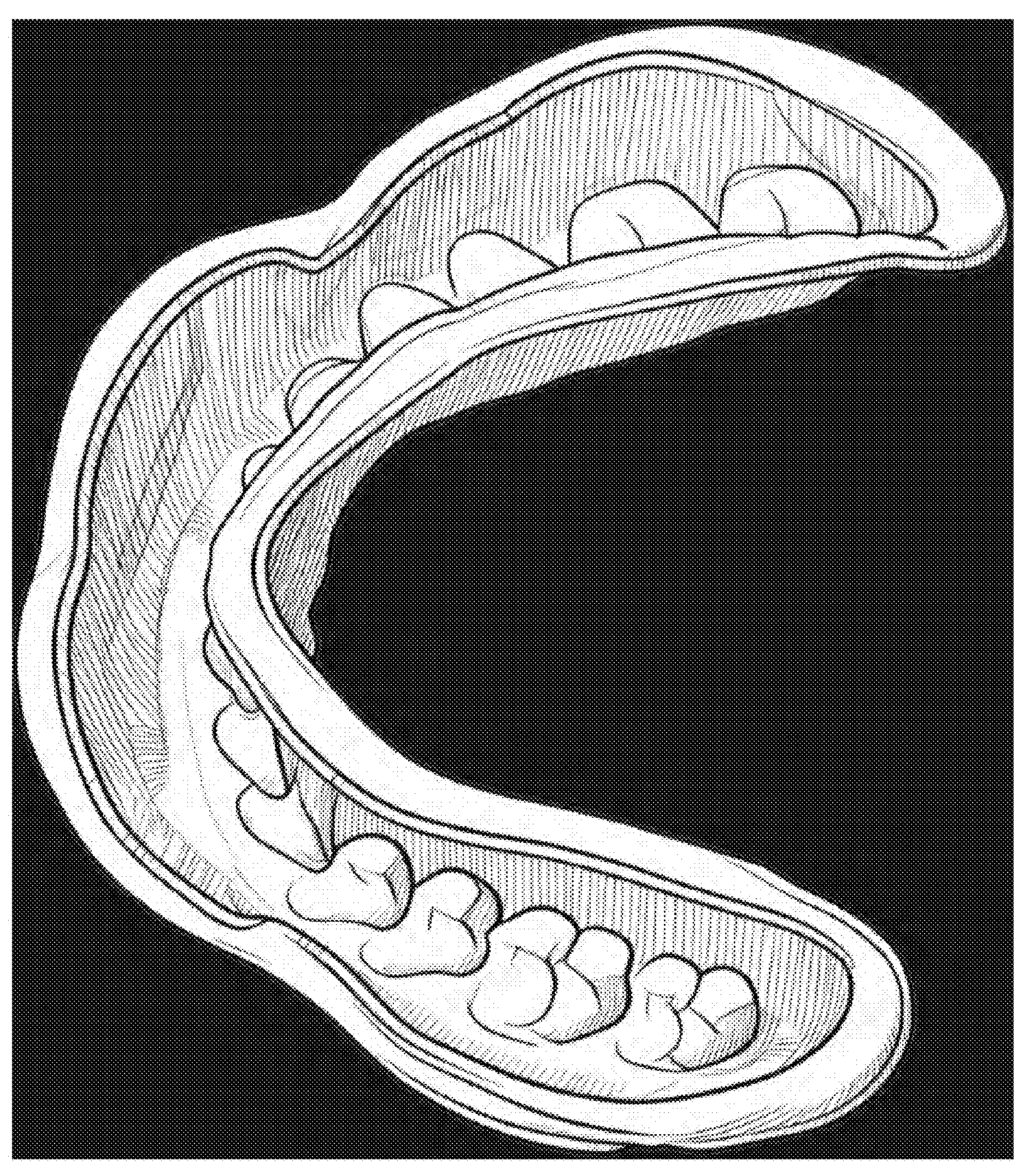
FIG. 14 is a schematic diagram of physical tooth arrangement using a tooth guide plate according to an embodiment of the present disclosure.

The steps of fabricating the denture by using the materialized tooth guide plate are as follows: first of all, the physical prefabricated teeth abraded are accurately put into corresponding female mold forms in the 3D printed tooth guide plate one by one according to the tooth positions, as shown in FIG. 14. Then, as a whole, the tooth guide plate loaded with all the physical prefabricated teeth is accurately located on the physical work model (plaster model) of the patient, as shown in FIG. 12. There is an accurate adaptive relationship between the guide plate and the work model, and all the prefabricated teeth are guaranteed to be located at the designed three-dimensional positions simultaneously. Then, the technician fills a gap between a root of the physical prefabricated tooth and the work model with wax, fills and sculpts the gaps with molten wax to form the wax base, and finally forms a complete denture wax pattern.

Finally, based on this accurately fabricated denture wax pattern, a conventional lost-wax process in this field is used for subsequent fabrication, that is, flasking, gypsum investment, flasking opening and dewaxing, and injection of a final base material (such as thermosetting resin), to complete fabrication of the denture. In this embodiment, the traditional manual tooth arrangement step demanding most about technology is replaced with the digital means, and fabrication difficulty is significantly reduced.

In addition, the embodiments of the present disclosure further provide a system for digital fabrication of a denture. The system includes at least one processor and a memory connected to the processor. A computer program instruction is stored in the memory, and the instruction implements the method according to the example described above when executed by the processor.

Figure 18:
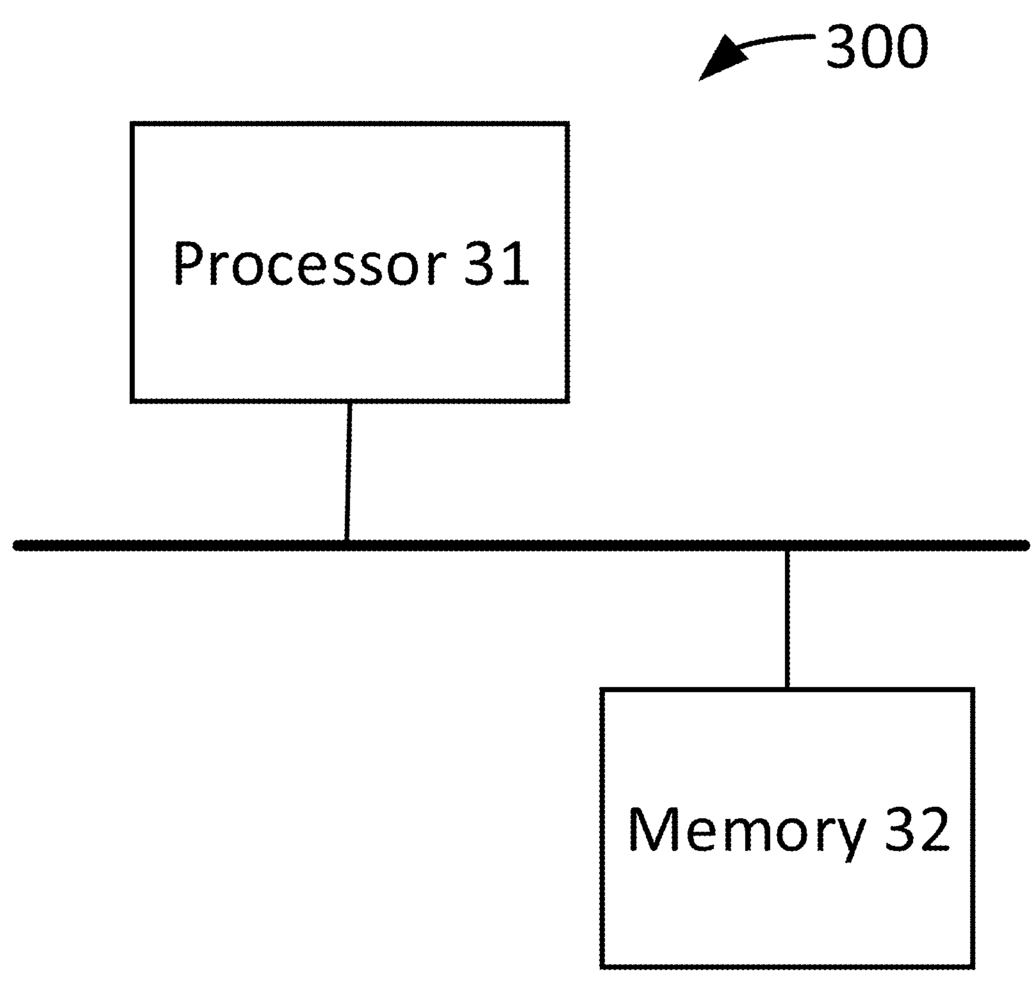
FIG. 18 is a schematic structural diagram of an electronic device according to an embodiment of the present disclosure.

In addition, with reference to FIG. 18, FIG. 18 is a schematic structural diagram of an electronic device 300 according to the embodiment of the present disclosure. The electronic device 300 may be used as a hardware carrier of the system described above. The electronic device 300 includes one or more processors 31 and a memory 32. The memory 32 is connected to the one or more processors 31, for example, to the processor 31 through a bus.

The processor 31 is configured to support the electronic device 300 to perform corresponding functions in the method in the method embodiment described above. The processor 31 may be a central processing unit (CPU), a network processor (NP), a hardware chip, or any of their combinations. The hardware chip may be an application specific integrated circuit (ASIC), a programmable logic device (PLD) or their combinations. The PLD may be a complex programmable logic device (CPLD), a field-programmable gate array (FPGA), a generic array logic (GAL), or any of their combinations.

The memory 32 is configured to store program codes, etc. The memory may include a volatile memory (VM), such as a random access memory (RAM). The memory may alternatively include a non-volatile memory (NVM), such as a read-only memory (ROM), a flash memory, a hard disk drive (HDD), or a solid-state drive (SSD). The memory 32 may also include a combination of the memories of the types.

The memory 32 may be configured to store a non-volatile software program, and a non-volatile computer-executable program and module, such as a program instruction/module corresponding to the method for digital fabrication of a denture in the embodiment of the present disclosure. The processor 31 runs the non-volatile software program, instruction, and module stored in the memory 32, to perform functional applications and data processing of the method for digital fabrication of a denture and the system method for digital fabrication of a denture. That is, the functions of the modules or units of the method for digital fabrication of a denture and the system for digital fabrication of a denture according to the method embodiments described above are implemented.

The memory 32 may include a program storage area and a data storage area. The program storage area may store an operating system and an application required for at least one function. The data storage area may store data, etc. created by using the system for digital fabrication of a denture. In some embodiments, the memory 32 optionally includes memories remotely arranged with respect to the processor 31, and these remote memories may be connected to the system for digital fabrication of a denture through a network. Instances of the network described above include, but are not limited to, the Internet, an Intranet, a local area network, a mobile communication network, and their combinations.

One or more modules are stored in the memory 32, and when performed by one or more processors 31, one or more modules perform the method for digital fabrication of a denture in any of the method embodiments described above, for example, the method steps described in the method embodiments described above, to implement the functions of the modules in the device embodiments described above.

The embodiments of the present disclosure further provide a computer-readable storage medium. The computer-readable storage medium stores a computer program, the computer program includes a program instruction, and when executed by a computer, the program instruction cause the computer to perform the method according to the embodiment described above.

For those of ordinary skill in the art, all or some processes in the method of the embodiments described above can be implemented by instructing related hardware by the computer program. The program may be stored in a computer-readable storage medium, and the program may include the processes of the method embodiments described above when executed. The storage medium may be a magnetic disk, an optical disk, a read-only memory (ROM), or a random access memory (RAM).

The embodiments disclosed above are merely preferred embodiments of the present disclosure, and cannot be used to limit the scope of the present disclosure undoubtedly. The equivalent changes made according to the claims of the present disclosure should fall within the scope of the present disclosure.

What is claimed is:

1. A method for digital fabrication of a denture, comprising:

editing attributes of one or more three-dimensional models of a prefabricated tooth, and establishing a template database comprising the one or more three-dimensional models of the prefabricated tooth, wherein the attributes comprise a tooth position, a pose, and a feature marking point;

obtaining oral data of a patient, and performing tooth arrangement design and base design, wherein the tooth arrangement design comprises selecting, from the template database or generating, according to a feature parameter of the patient, the one or more three-dimensional models of the prefabricated tooth, and the tooth arrangement design and the base design are used to generate a virtual denture model representing a form of the denture;

determining, based on the virtual denture model, a three-dimensional model of a positioning auxiliary body for positioning a corresponding physical prefabricated tooth;

fabricating a materialized positioning auxiliary body according to the three-dimensional model of the positioning auxiliary body; and using the materialized positioning auxiliary body to physically position and arrange the physical prefabricated tooth corresponding to the one or more three-dimensional models of the prefabricated tooth, and bonding the physical prefabricated tooth to a gingival base material, to form the denture.

2. The method according to claim 1, wherein the feature marking point of the attributes comprises:

at least one of an occlusal surface marking point, a gingival margin marking point, a buccolingual marking point, and a mesiodistal marking point of the prefabricated tooth; and the attributes further comprise an overall dental arch form of a prefabricated tooth dentition and a relative spatial relationship between teeth in the dentition.

3. The method according to claim 2, wherein the step of selecting, from the template database, the one or more three-dimensional models of the prefabricated tooth specifically comprises:

marking an anatomical landmark point according to the oral data of the patient;

selecting a matching from the one or more three-dimensional models of the prefabricated tooth by combining attributes of the dental arch form and a dentition width stored in the template database according to spatial information determined by the anatomical landmark point; and completing initial positioning arrangement based on a correspondence relationship between the anatomical landmark point and the tooth position in the one or more three-dimensional models of the prefabricated tooth.

4. The method according to claim 2, wherein the tooth arrangement design comprises performing three-dimensional pose adjustment on a single tooth, a segmented dentition, or an overall dentition based on the relative spatial relationship between the teeth.

5. The method according to claim 2, wherein the base design comprises:

automatically generating a gingival line of a base according to a gingival margin marking point edited on the prefabricated tooth after virtual tooth arrangement design, and generating a base model based on the gingival line.

6. The method according to claim 5, wherein the base design further comprises:

automatically adjusting, when the gingival margin marking point on any prefabricated tooth is detected to be lower than a preset first base safety thickness threshold, a position of the marking point to a height satisfying a requirement from the first threshold, and generating the gingival line.

7. The method according to claim 1, wherein after the virtual denture model is generated, and before the three-dimensional model of the positioning auxiliary body is generated, the method further comprises:

computing, based on the virtual denture model, an area to be abraded when the prefabricated tooth is fitted to a base since the prefabricated tooth is exposed outside the base or intrudes into a minimum thickness of the base, to generate data of the area to be abraded.

8. The method according to claim 7, wherein the positioning auxiliary body is a tooth root abrading guide plate, and a step of generating the tooth root abrading guide plate comprises:

processing, according to the data of the area to be abraded, a part to be kept in the one or more three-dimensional models of the prefabricated tooth, to generate a three-dimensional model of the tooth root abrading guide plate, wherein the tooth root abrading guide plate is provided with an inner cavity matching the part to be kept in the prefabricated tooth, to expose the area to be abraded after the physical prefabricated tooth is inserted.

9. The method according to claim 8, wherein a digital identifier of a tooth position number or a prefabricated tooth model for identification is further arranged on an outer wall of the three-dimensional model of the tooth root abrading guide plate.

10. The method according to claim 1, wherein the positioning auxiliary body is a flasking guide plate, and a method for generating the flasking guide plate comprises:

processing the virtual denture model to generate an inner wall and an outer wall that have a preset second thickness, and dividing, based on a preset cutting line, a generated model into a bottom plate and a snapping plate that are detachable.

11. The method according to claim 10, wherein snap-fit recesses or positioning structures that match mutually are provided in edges of the bottom plate and the snapping plate of the flasking guide plate, and an injection channel for injecting the gingival base material and an overflow hole for exhausting air are further provided in the flasking guide plate.

12. The method according to claim 11, wherein the using the materialized positioning auxiliary body to physically position and arrange the physical prefabricated tooth corresponding to the one or more three-dimensional models of the prefabricated tooth, and bonding the physical prefabricated tooth to a gingival base material to form the denture comprise:

coating an inner cavity of the flasking guide plate with a separating agent;

putting the physical prefabricated teeth subjected to abrasion into corresponding tooth position impressions in an inner cavity of the bottom plate of the flasking guide plate one by one;

covering and fixing the snapping plate, and injecting the liquid gingival base material through the injection channel; and opening the flasking guide plate after the gingival base material is solidified, and taking out a molded denture.

13. The method according to claim 12, wherein after the taking out a molded denture, the method further comprises:

performing three-dimensional scanning on the molded denture, and obtaining actual three-dimensional data;

comparing an original virtual denture model with the actual three-dimensional data, and computing a deviation; and driving a finishing apparatus to perform automatic finishing on the molded denture according to the deviation.

14. The method according to claim 1, wherein the positioning auxiliary body is a tooth guide plate, and a method for generating the tooth guide plate comprises:

fusing the virtual denture model and a digital work model of the patient into an integrated model by a Boolean operation, and processing an area comprising a crown form on the integrated model, to generate the tooth guide plate with an inner surface of a female mold form.

15. The method according to claim 14, wherein the step of using the materialized positioning auxiliary body comprises:

putting the physical prefabricated teeth into corresponding female mold forms of the tooth guide plate one by one;

positioning the tooth guide plate loaded with the physical prefabricated teeth on the work model of the patient;

performing wax filling between the physical prefabricated teeth and the work model to form a wax base, and forming a wax pattern of the denture; and adopting a lost-wax process for flasking, investment, dewaxing, and material injection based on the wax pattern of the denture, to fabricate the denture.

16. The method according to claim 1, wherein the virtual denture model is a split virtual model, and steps of generating the split virtual model comprise:

performing a virtual Boolean subtraction operation on the one or more three-dimensional models of the prefabricated tooth according to data of an area to be abraded;

fusing all three-dimensional models of prefabricated teeth after the virtual subtraction operation into a dentition model; and performing the Boolean subtraction operation on a base model by using the dentition model, to generate sockets on the base model for accommodating the physical prefabricated teeth.

17. A system for digital fabrication of a denture, comprising at least one processor and a memory connected to the processor, wherein a computer program instruction is stored in the memory, and the instruction implements the method according to claim 1 when executed by the processor.

18. The system according to claim 17, wherein when executed, the instruction implements functions of modules as follows:

a data templating module configured to edit attributes of one or more three-dimensional models of a prefabricated tooth, and establish a template database comprising the one or more three-dimensional models of the prefabricated tooth, wherein the attributes comprise a tooth position, a pose, and a feature marking point;

a virtual design module configured to obtain oral data of a patient, and perform tooth arrangement design and base design, to generate a virtual denture model representing a form of the final denture; and a positioning auxiliary body generating module configured to generate, based on the virtual denture model, a three-dimensional model of a positioning auxiliary body used for accurately positioning a corresponding physical prefabricated tooth in a subsequent physical fabrication process.

19. The system according to claim 18, wherein the virtual design module is further configured to compute an area to be abraded from the physical prefabricated tooth when the prefabricated tooth is fitted to a base, to generate data of the area to be abraded, and the positioning auxiliary body generating module is further configured to generate a three-dimensional model of a tooth root abrading guide plate according to the data of the area to be abraded.

20. The system according to claim 18, wherein the positioning auxiliary body generating module is specifically configured to:

process and segment the virtual denture model, to generate a flasking guide plate model; or fuse and process the virtual denture model and a work model, to generate a tooth guide plate model.

* * * * *